(12) United States Patent
Williamson

(10) Patent No.: US 10,082,290 B2
(45) Date of Patent: Sep. 25, 2018

(54) PORTABLE CHIMNEY SYSTEM

(71) Applicant: Eric Williamson, Warrenton, OR (US)

(72) Inventor: Eric Williamson, Warrenton, OR (US)

(*) Notice: Subject to any disclaimer, the term of this patent is extended or adjusted under 35 U.S.C. 154(b) by 164 days.

(21) Appl. No.: 14/973,841

(22) Filed: Dec. 18, 2015

(65) Prior Publication Data
US 2017/0176002 A1  Jun. 22, 2017

(51) Int. Cl.
B62D 63/08 (2006.01)
F23J 11/08 (2006.01)
F23J 11/04 (2006.01)
E04F 17/02 (2006.01)

(52) U.S. Cl.
CPC .............. F23J 11/08 (2013.01); B62D 63/08 (2013.01); E04F 17/026 (2013.01); F23J 11/04 (2013.01); E04F 17/02 (2013.01); F23J 2213/20 (2013.01)

(58) Field of Classification Search
None
See application file for complete search history.

(56) References Cited

U.S. PATENT DOCUMENTS

| | | | | |
|---|---|---|---|---|
| 1,328,071 A | * | 1/1920 | Baldwin | B60N 3/16 126/276 |
| 1,477,111 A | * | 12/1923 | Eaton | B60P 3/341 296/174 |
| 2,229,277 A | * | 1/1941 | Clements | B60H 1/2212 126/110 R |
| 2,297,175 A | * | 9/1942 | Tarran | E04B 1/3205 52/270 |
| 2,461,424 A | * | 2/1949 | Jones | B61D 27/0036 237/40 |
| 2,523,569 A | * | 9/1950 | Harvey | B60H 1/00364 126/110 B |
| 2,569,983 A | * | 10/1951 | Favre | B62D 35/00 105/1.1 |
| 2,582,066 A | * | 1/1952 | Resek | F24C 3/004 126/110 B |
| 2,804,066 A | * | 8/1957 | McCutchen | F24H 3/065 126/110 B |
| 3,107,662 A | * | 10/1963 | Genge | F24B 1/202 126/59 |
| 3,425,740 A | * | 2/1969 | De Vaughn | B62D 35/002 135/117 |
| 3,479,079 A | * | 11/1969 | Coursault | B60P 3/423 296/26.06 |
| 3,712,316 A | * | 1/1973 | Leonard | B60P 3/38 135/116 |

(Continued)

FOREIGN PATENT DOCUMENTS

WO  WO2013043890  3/2013

Primary Examiner — Gregory Huson
Assistant Examiner — Martha Becton

(57) ABSTRACT

A portable chimney system includes a trailer having an opening extending into an interior of the trailer. A door is hingedly coupled to the trailer and the door is positionable in a closed position. An awning is removably coupled to the trailer. The awning is selectively positioned on the rear side such that the awning surrounds the opening. The door abuts the awning when the door is positioned in the closed position. A chimney is removably coupled to the awning. The chimney may be fluidly coupled to a stove is positioned within the trailer thereby facilitating the chimney to direct combustion gases outwardly from the trailer.

17 Claims, 5 Drawing Sheets

(56) References Cited

U.S. PATENT DOCUMENTS

| | | | | |
|---|---|---|---|---|
| 3,724,893 A | * | 4/1973 | Giroux | B60P 3/341 135/116 |
| 3,746,386 A | * | 7/1973 | Woodward | B60P 3/38 135/115 |
| RE29,264 E | * | 6/1977 | Woodward | B60P 3/38 135/117 |
| 4,069,806 A | * | 1/1978 | Landry | F24B 1/205 126/301 |
| 4,077,662 A | * | 3/1978 | Kauffman | B60P 3/38 135/88.17 |
| 4,152,844 A | * | 5/1979 | Materniak, nee Balcerowicz | D06F 58/20 251/116 |
| 4,221,425 A | * | 9/1980 | Welle | B60P 3/34 296/146.11 |
| 4,309,053 A | | 1/1982 | Lett | |
| D269,043 S | * | 5/1983 | Resnicoff | D23/411 |
| 4,643,167 A | * | 2/1987 | Brewer | B60P 3/0257 126/273 A |
| 4,653,800 A | * | 3/1987 | Myers | B60P 3/38 135/88.16 |
| 4,818,015 A | * | 4/1989 | Scanlon | B62D 35/001 296/180.1 |
| 4,912,338 A | * | 3/1990 | Bingham | B60P 3/42 126/299 D |
| 4,924,763 A | * | 5/1990 | Bingham | A21B 1/26 126/21 A |
| 5,031,602 A | * | 7/1991 | Vick | A47J 37/0713 126/1 AA |
| 5,203,316 A | * | 4/1993 | Pritchett | E04H 15/14 126/15 R |
| 5,226,689 A | * | 7/1993 | Roe | B60P 3/34 296/159 |
| 5,255,664 A | * | 10/1993 | Gurliacci | A47J 37/0704 126/25 R |
| 5,685,597 A | * | 11/1997 | Reid | B62D 35/002 248/202.1 |
| 5,806,906 A | * | 9/1998 | Hammond | B60J 1/2011 296/165 |
| 5,833,295 A | * | 11/1998 | Farlow, Jr. | B60P 3/14 296/22 |
| 6,148,629 A | * | 11/2000 | Boxum | B60H 1/00364 62/239 |
| 6,431,628 B1 | * | 8/2002 | Bell, Jr. | B60P 3/0257 296/22 |
| 6,959,958 B2 | | 11/2005 | Basford | |
| 7,234,760 B1 | | 6/2007 | Crean | |
| 7,527,318 B2 | * | 5/2009 | Geise | B60P 3/341 296/100.06 |
| 7,568,491 B2 | | 8/2009 | Banfill et al. | |
| 7,686,011 B1 | * | 3/2010 | Williams | F23B 40/08 110/108 |
| 8,001,985 B1 | * | 8/2011 | Conner | E04H 9/02 135/904 |
| 8,007,030 B2 | | 8/2011 | Wood | |
| 8,079,634 B2 | * | 12/2011 | Visser | B62D 35/004 296/180.1 |
| 8,267,105 B1 | * | 9/2012 | Denmark, Jr. | E04H 15/08 135/117 |
| 8,820,817 B1 | * | 9/2014 | Anderson | B62D 35/004 296/180.1 |
| 8,979,157 B2 | * | 3/2015 | Nelson | B60R 9/065 135/88.13 |
| 2003/0094833 A1 | * | 5/2003 | Thompson | E04H 15/08 296/163 |
| 2008/0016792 A1 | * | 1/2008 | Messman | E04B 1/3205 52/93.1 |
| 2009/0253359 A1 | * | 10/2009 | Smith | F23J 11/10 454/42 |
| 2011/0068603 A1 | * | 3/2011 | Domo | B62D 35/001 296/180.1 |
| 2015/0143833 A1 | * | 5/2015 | Baker | F25B 15/00 62/244 |

\* cited by examiner

PORTABLE CHIMNEY SYSTEM

BACKGROUND OF THE DISCLOSURE

Field of the Disclosure

The disclosure relates to chimney devices and more particularly pertains to a new chimney device for facilitating a stove to be used within a trailer without permanently installing a chimney in the trailer.

SUMMARY OF THE DISCLOSURE

An embodiment of the disclosure meets the needs presented above by generally comprising a trailer having an opening extending into an interior of the trailer. A door is hingedly coupled to the trailer and the door is positionable in a closed position. An awning is removably coupled to the trailer. The awning is selectively positioned on the rear side such that the awning surrounds the opening. The door abuts the awning when the door is positioned in the closed position. A chimney is removably coupled to the awning. The chimney may be fluidly coupled to a stove is positioned within the trailer thereby facilitating the chimney to direct combustion gases outwardly from the trailer.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
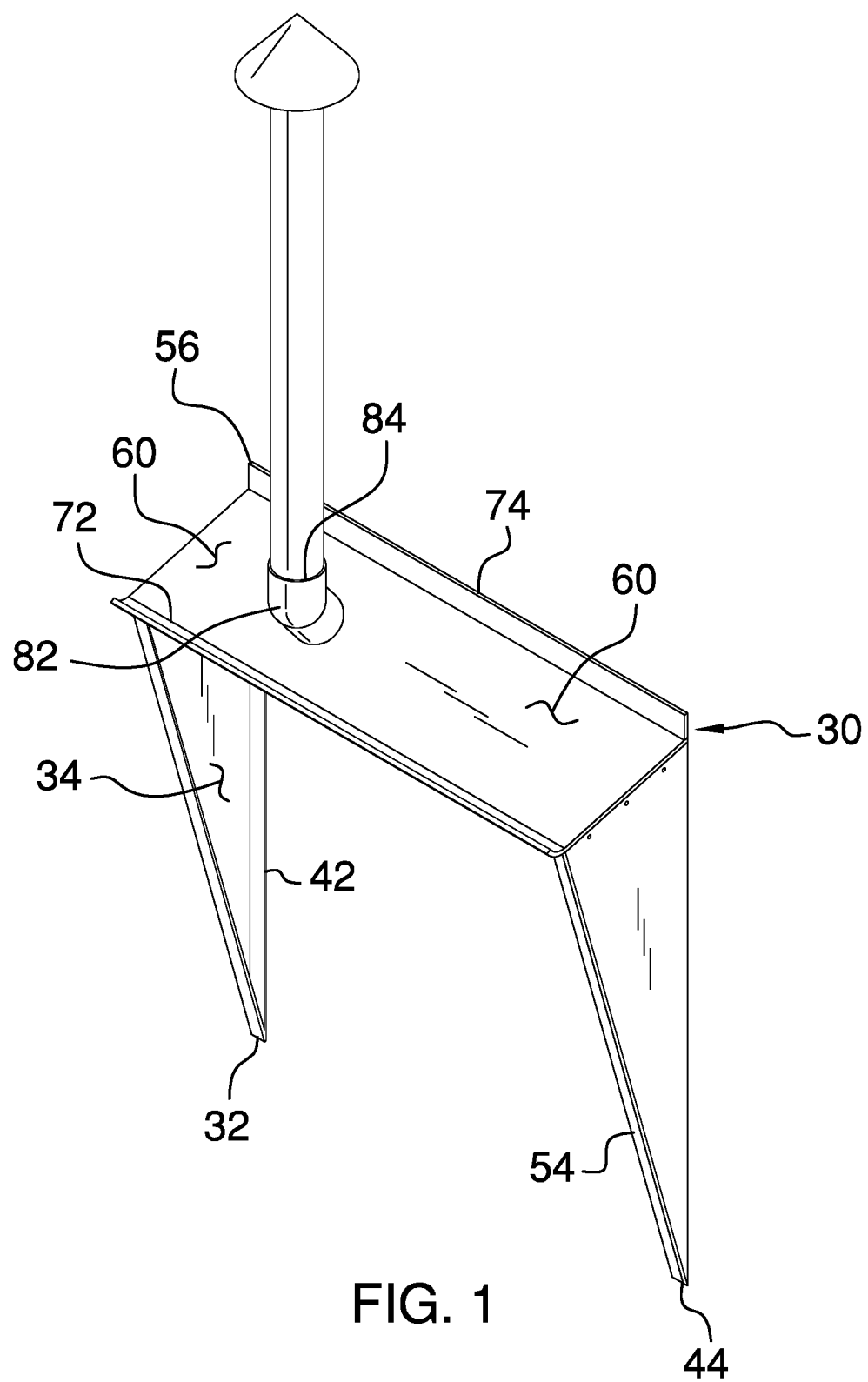
FIG. 1 is a perspective view of a portable chimney system according to an embodiment of the disclosure.
Figure 2:
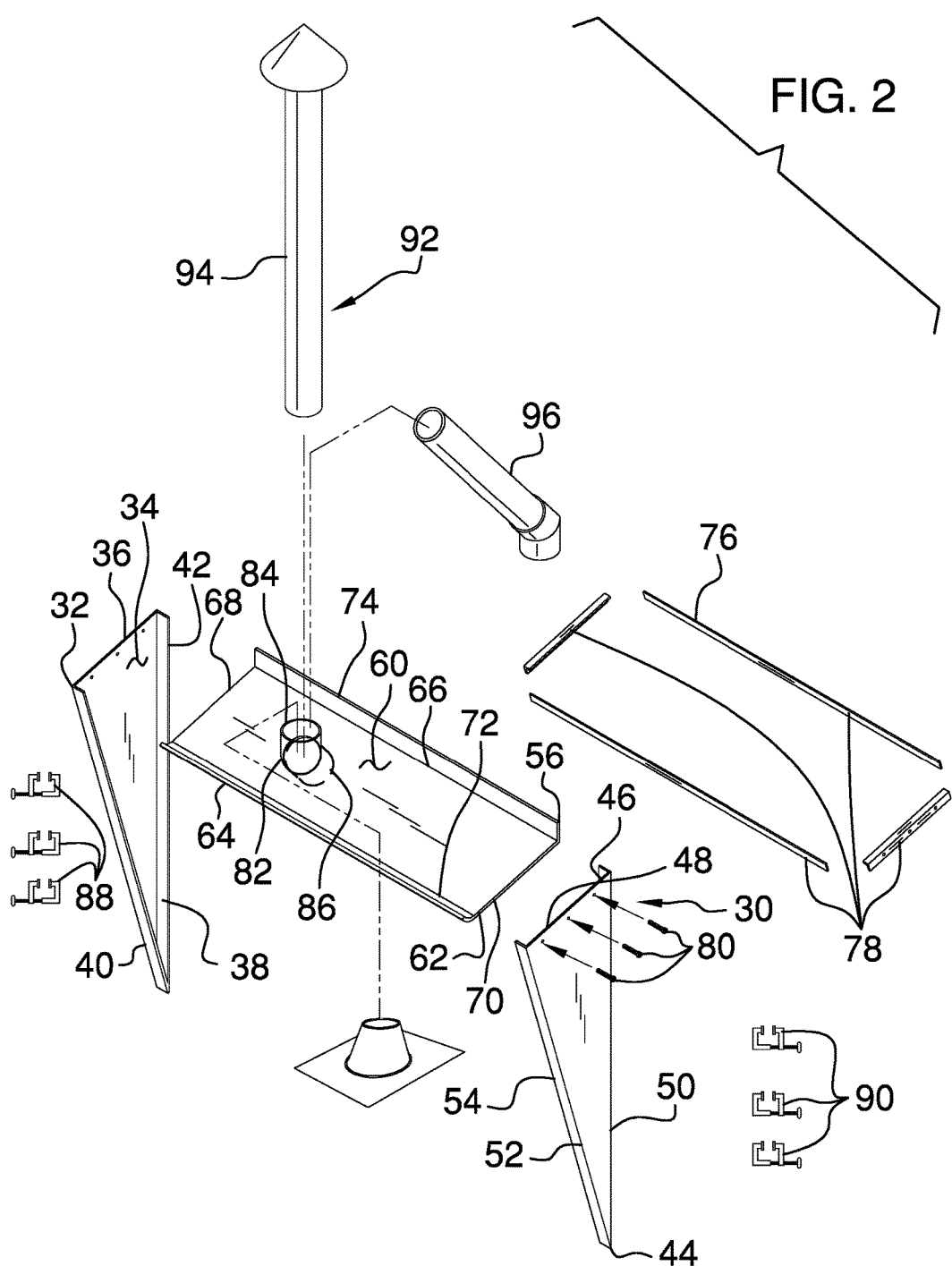
FIG. 2 is an exploded perspective view of an embodiment of the disclosure.
Figure 3:
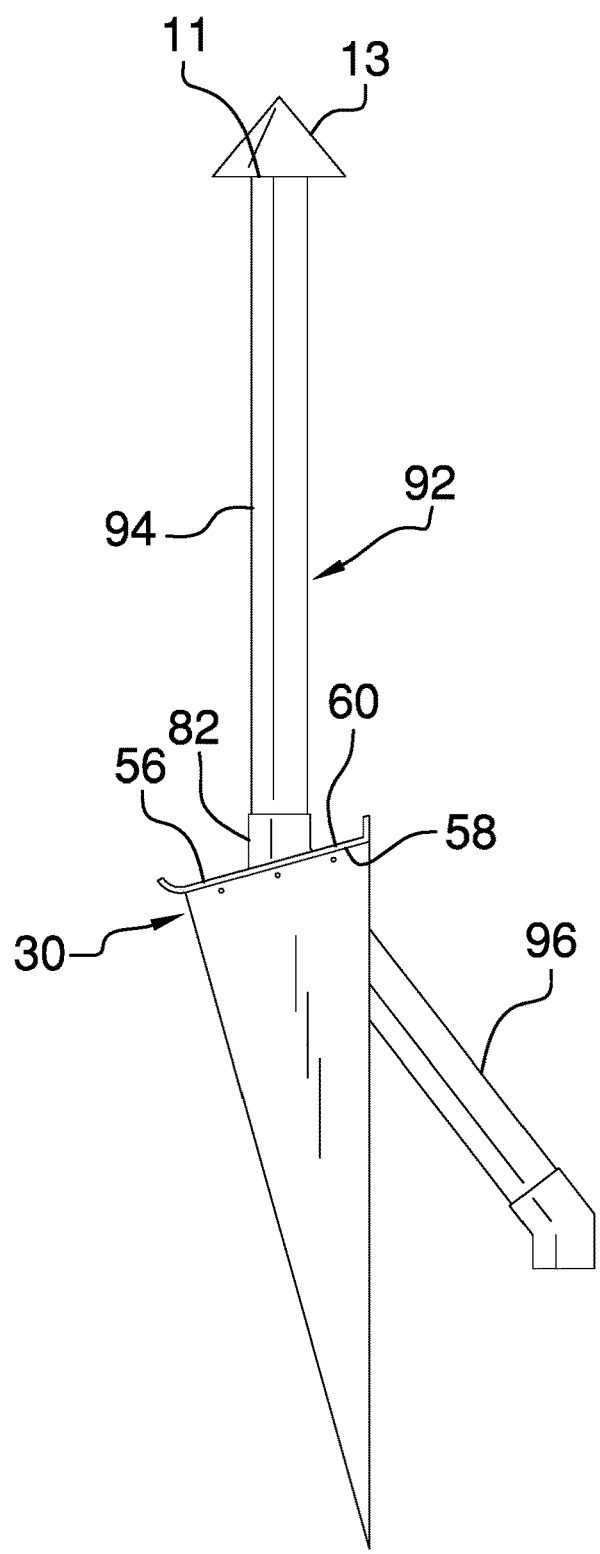
FIG. 3 is a right side view of an embodiment of the disclosure.
Figure 4:
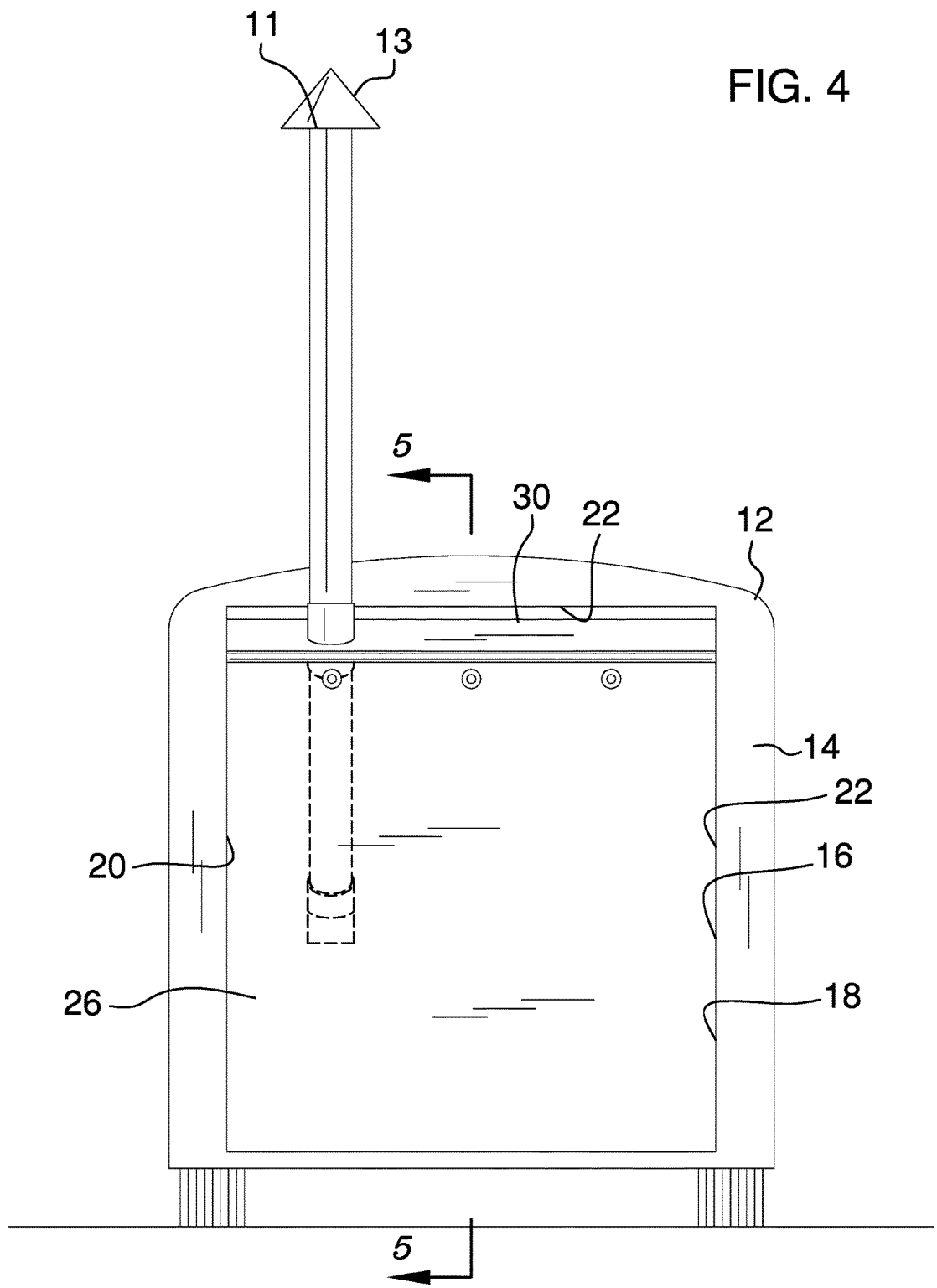
FIG. 4 is a back view of an embodiment of the disclosure.
Figure 5:
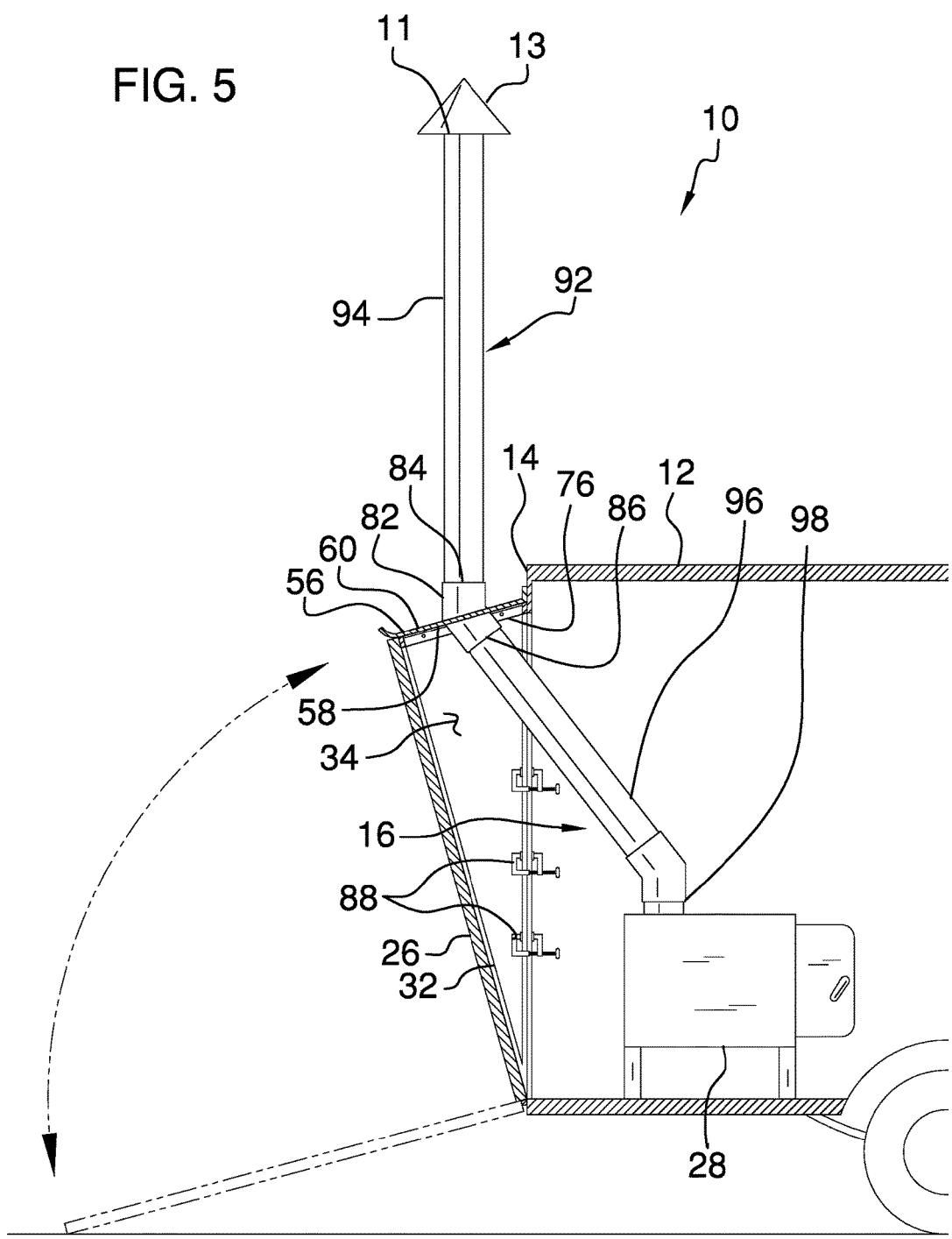
FIG. 5 is a cross sectional view taken along line 5-5 of FIG. 4 of an embodiment of the disclosure.

With reference now to the drawings, and in particular to FIGS. 1 through 5 thereof, a new chimney device embodying the principles and concepts of an embodiment of the disclosure and generally designated by the reference numeral 10 will be described.

As best illustrated in FIGS. 1 through 5, the portable chimney system 10 generally comprises a trailer 12 that has a rear side 14 and the rear side 14 has an opening 16 extending into an interior of the trailer 12. The opening 16 has a bounding edge 18 and the bounding edge 18 has a first side 20, a top side 22 and a second side 24. A door 26 is hingedly coupled to the rear side 14 and the door 26 is positionable in an open position to access the interior. The door 26 is positionable in a closed position such that the door 26 closes the opening 16. The trailer 12 may comprise a covered cargo trailer or the like.

A stove 28 may be positioned within the trailer 12. The stove 28 may comprise a wood burning stove or the like. An awning 30 is removably coupled to the trailer 12. The awning 30 is selectively positioned on the rear side 14 such that the awning 30 surrounds the opening 16. The door 26 abuts the awning 30 when the door 26 is positioned in the closed position.

The awning 30 includes a first side panel 32 that has a first surface 34, a top edge 36, a first lateral edge 38 and a second lateral edge 40. The first lateral edge 38 and the second lateral edge 40 of the first side panel 32 tapers to a point from the top edge 36. Thus, the first side panel 32 has a triangular shape. The first side panel 32 has a lip 42 extending away from the first surface 34. The lip 42 is coextensive with each of the first lateral edge 38 and the second lateral edge 40. The first side panel 32 is positioned on the rear side 14 of the trailer 12 such that the lip 42 corresponding to the first lateral edge 38 is coextensively aligned with the first side 20 of the opening 16.

The awning 30 further includes a second side panel 44 that has a first surface 46, a top edge 48, a first lateral edge 50 and a second lateral edge 52. The first lateral edge 50 and the second lateral edge 52 of the second side panel 44 tapers to a point from the top edge 48 of the second side panel 44. Thus, the second side panel 44 has a triangular shape. The second side panel 44 has a lip 54 extending away from the first surface 46 of the second side panel 44. The lip 54 of the second side panel 44 is coextensive with each of the first lateral edge 50 and the second lateral edge 52 of the second side panel 44. The second side panel 44 is positioned on the rear side 14 of the trailer 12 such that the lip 54 corresponding to the first lateral edge 50 of the second side panel 44 is coextensively aligned with the second side 24 of the opening 16.

A top panel 56 has a bottom surface 58, a top surface 60 and a peripheral edge 62. The peripheral edge 62 has a front side 64, a back side 66, a first flanking side 68 and a second flanking side 70. The top panel 56 has a bend 72 thereon. The bend 72 is coextensive with the front side 64 such that the front side 64 is directed upwardly from the top panel 56.

The top panel 56 has a first lip 74 extending away from the top surface 60 and the first lip 74 is coextensive with the back side 66. The top panel 56 has a second lip 76 extending downwardly from the bottom surface 58. The second lip 76 is coextensive with the peripheral edge 62. The top panel 56 is positioned on the rear side 14 of the trailer 12 such that the first lip 74 is coextensively aligned with the top side 22 of the opening 16.

The second lip 76 may be an integral component of the top panel 56. The second lip 76 may alternatively comprise a plurality of rails 78. Each of the rails 78 may be fastened to the bottom surface 58. Each of the rails 78 may be welded to the bottom surface 58.

The first side panel 32 is removably coupled to the second lip 76 corresponding to the first flanking side 68 having the top edge 36 of the first side panel 32 abutting the bottom surface 58. The second side panel 44 is removably coupled to the second lip 76 corresponding to the second flanking side 70 having the top edge 48 of the second side panel 44 abutting the bottom surface 58. The door 26 abuts the lip 42 corresponding to the second lateral edge 40 of the first side panel 32, the lip 54 corresponding to the second lateral edge 52 of the second side panel 44 and the second lip 76 corresponding to the front side 64 when the door 26 is positioned in the closed position.

A plurality of bolts 80 may be provided. The bolts 80 may extend through each of the first side panel 32 and the second side panel 44. The bolts 80 may engage the second lip 76. Thus, each of the first side panel 32 and the second side panel 44 are removably retained on the top panel 56. Each of the first side panel 32 and the second side panel 44 may be removably coupled to the top panel 56 through any conventional mechanical means.

A sleeve 82 extends through the top panel 56. The sleeve 82 has a first end 84 and a second end 86. The sleeve 82 is angled between the first end 84 and the second end 86. The first end 84 is directed upwardly from the top surface 60 and the second end 86 is directed downwardly from the bottom surface 58.

A first set of clamps 88 is provided. Each of the first set of clamps 88 selectively fastens the lip 42 corresponding to the first side panel 32 to the rear side 14 of the trailer 12. Thus, the first side panel 32 is removably retained on the trailer 12. The first set of clamps 88 may be clamps of any conventional design.

A second set of clamps 90 is provided. Each of the second set of clamps 90 selectively fastens the lip 54 corresponding to the second side panel 44 to the rear side 14 of the trailer 12. Thus, the second side panel 44 is removably retained on the trailer 12. The second set of clamps 90 may be clamps of any conventional design.

A chimney 92 is provided. The chimney 92 is removably coupled to the awning 30. The chimney 92 may be fluidly coupled to the stove 28. Thus, the chimney 92 may direct combustion gases outwardly from the trailer 12.

The chimney 92 comprises a first pipe 94 that is removably insertable into the first end 84 of the sleeve 82 such that the first pipe 94 extends upwardly from the top panel 56. A second pipe 96 is removably insertable into the second end 86 of the sleeve 82 such that the second pipe 96 is in fluid communication with the first pipe 94. The second pipe 96 is fluidly coupled to an exhaust 98 of the stove 28. Thus, the combustion gases are exhausted through the first pipe 94.

The first pipe 94 has a distal end 11 with respect to the sleeve 82. A cap 13 is positioned on the first pipe 94. The cap 13 is spaced from the distal end 11 such that the cap 13 allows the combustion gases to exit the distal end 11. The cap 13 inhibits precipitation from entering the distal end 11.

In use, the door 26 is positioned in the open position. Each of the first side panel 32 and the second side panel 44 are fastened to the top panel 56 to define the awning 30. The awning 30 is positioned on the rear side 14 of the trailer 12 such that the awning 30 surrounds the opening 16. The first set of clamps 88 is manipulated to fasten the first side panel 32 to the rear side 14. The second set of clamps 90 is manipulated to fasten the second side panel 44 to the rear side 14.

The first pipe 94 is positioned in the first end 84 of the sleeve 82. The second pipe 96 is positioned to extend between the second end 86 of the sleeve 82 and the exhaust 98 of the stove 28. Thus, the chimney 92 facilitates the combustion gases from the stove 28 to be vented from the trailer 12. The awning 30 facilitates the stove 28 to be used in the trailer 12 without having to penetrate the trailer 12 to install the chimney 92.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable chimney system comprising:
    a trailer having an opening extending into an interior of said trailer, said trailer including a door being hingedly coupled to said trailer, said door being positionable in a closed position;
    an awning being removably coupled to said trailer, said awning being positioned on said rear side such that said awning surrounds said opening, said door abutting said awning when said door is positioned in said closed position; and
    a chimney being removably coupled to said awning, said chimney being configured to be fluidly coupled to a stove being positioned within said trailer thereby facilitating said chimney to direct combustion gases outwardly from said trailer.

2. The system according to claim 1, wherein said trailer has a rear side, said opening extending through said rear side, said opening having a bounding edge, said bounding edge having a first side, a top side and a second side, said trailer having a door being hingedly coupled to said rear side, said door being positionable in an open position to access said interior, said door being positionable in a closed position such that said door closes said opening.

3. The system according to claim 1, wherein said awning includes a first side panel having a first surface, a top edge, a first lateral edge and a second lateral edge, said first lateral edge and said second lateral edge of said first side panel tapering to a point from said top edge of said first side panel such that said first side panel has a triangular shape.

4. The system according to claim 3, wherein:
    wherein said trailer has a rear side, said opening extending through said rear side, said opening having a first side; and
    said first side panel having a lip extending away from said first surface, said lip being coextensive with each of said first lateral edge and said second lateral edge, said first side panel being positioned on said rear side of said trailer such that said lip corresponding to said first lateral edge is coextensively aligned with said first side of said opening.

5. The system according to claim 1, wherein said awning includes a first side panel and a second side panel, said second side panel having a first surface, a top edge, a first lateral edge and a second lateral edge, said first lateral edge and said second lateral edge of said second side panel tapering to a point from said top edge of said second side panel such that said second side panel has a triangular shape.

6. The system according to claim 5, wherein:
wherein said trailer has a rear side, said opening extending through said rear side, said opening having a second side; and
said second side panel has a lip extending away from said first surface of said second side panel, said lip of said second side panel being coextensive with each of said first lateral edge and said second lateral edge of said side panel, said second side panel being positioned on said rear side of said trailer such that said lip corresponding to said first lateral edge of said second side panel is coextensively aligned with said second side of said opening.

7. The system according to claim 1, wherein said awning includes a top panel having a bottom surface, a top surface and a peripheral edge, said peripheral edge having a front side, a back side, a first flanking side and a second flanking side, said top panel having a bend thereon, said bend being coextensive with said front side such that said front side is directed upwardly from said top panel, said top panel having a first lip extending away from said top surface, said first lip being coextensive with said back side.

8. The system according to claim 7, wherein said top panel has a second lip extending downwardly from said bottom surface, said second lip being coextensive with said peripheral edge, said top panel being positioned on said rear side of said trailer such that said first lip is coextensively aligned with said top side of said opening.

9. The system according to claim 8, wherein:
said awning includes a first side panel, said first side panel having a top edge; and
said first side panel being removably coupled to said second lip corresponding to said first flanking side having said top edge of said first side panel abutting said bottom surface.

10. The system according to claim 8, wherein:
said awning includes a second side panel, said second side panel having a top edge; and
said second side panel being removably coupled to said second lip corresponding to said second flanking side having said top edge of said second side panel abutting said bottom surface.

11. The system according to claim 10, wherein:
said awning includes a first side panel, said first side panel having a lip and a second lateral edge;
said second side panel having a lip and a second lateral edge; and
said door abutting said lip corresponding to said second lateral edge of said first side panel, said lip corresponding to said second lateral edge of said second side panel and said second lip corresponding to said front side when said door is positioned in said closed position.

12. The system according to claim 7, further comprising a sleeve extending through said top panel, said sleeve having a first end and a second end, said sleeve being angled between said first end and said second end, said first end being directed upwardly from said top surface, said second end being directed downwardly from said bottom surface.

13. The system according to claim 3, further comprising a first set of clamps, each of said first set of clamps selectively fastening said lip corresponding to said first side panel to said rear side of said trailer such that said first side panel is removably retained on said trailer.

14. The system according to claim 6, further comprising a first set of clamps and a second set of clamps, each of said second set of clamps selectively fastening said lip corresponding to said second side panel to said rear side of said trailer such that said second side panel is removably retained on said trailer.

15. The system according to claim 7, wherein said chimney comprises a first pipe being removably insertable into said first end of said sleeve such that said first pipe extends upwardly from said top panel.

16. The system according to claim 15, further comprising a second pipe being removably insertable into said second end of said sleeve such that said second pipe is in fluid communication with said first pipe, said second pipe being configured to be fluidly coupled to an exhaust of the stove thereby facilitating the combustion gases to be exhausted through said first pipe.

17. A portable chimney system comprising:
a trailer having a rear side, said rear side having an opening extending into an interior of said trailer, said opening having a bounding edge, said bounding edge having a first side, a top side and a second side, said trailer having a door being hingedly coupled to said rear side, said door being positionable in an open position to access said interior, said door being positionable in a closed position such that said door closes said opening; and
an awning being removably coupled to said trailer, said awning being selectively positioned on said rear side such that said awning surrounds said opening, said door abutting said awning when said door is positioned in said closed position, said awning including:
a first side panel having a first surface, a top edge, a first lateral edge and a second lateral edge, said first lateral edge and said second lateral edge of said first side panel tapering to a point from said top edge of said first side panel such that said first side panel has a triangular shape, said first side panel having a lip extending away from said first surface, said lip being coextensive with each of said first lateral edge and said second lateral edge, said first side panel being positioned on said rear side of said trailer such that said lip corresponding to said first lateral edge is coextensively aligned with said first side of said opening,
a second side panel having a first surface, a top edge, a first lateral edge and a second lateral edge, said first lateral edge and said second lateral edge of said second side panel tapering to a point from said top edge of said second side panel such that said second side panel has a triangular shape, said second side panel having a lip extending away from said first surface of said second side panel, said lip of said second side panel being coextensive with each of said first lateral edge and said second lateral edge of said side panel, said second side panel being positioned on said rear side of said trailer such that said lip corresponding to said first lateral edge of said second side panel is coextensively aligned with said second side of said opening, and
a top panel having a bottom surface, a top surface and a peripheral edge, said peripheral edge having a front side, a back side, a first flanking side and a second flanking side, said top panel having a bend thereon, said bend being coextensive with said front side such that said front side is directed upwardly from said top panel, said top panel having a first lip extending away from said top surface, said first lip being coextensive with said back side, said top panel having a second lip extending downwardly from said bottom surface, said second lip being coextensive with said peripheral edge, said top panel being positioned on said rear side of said trailer such that said first lip is coextensively aligned with said top side of said opening, said first side panel being removably coupled to said second lip corresponding to said first flanking side having said top edge of said first side panel abutting said bottom surface, said second side panel being removably coupled to said second lip corresponding to said second flanking side having said top edge of said second side panel abutting said bottom surface, said door abutting said lip corresponding to said second lateral edge of said first side panel, said lip corresponding to said second lateral edge of said second side panel and said second lip corresponding to said front side when said door is positioned in said closed position, and a sleeve extending through said top panel, said sleeve having a first end and a second end, said sleeve being angled between said first end and said second end, said first end being directed upwardly from said top surface, said second end being directed downwardly from said bottom surface;

a first set of clamps, each of said first set of clamps selectively fastening said lip corresponding to said first side panel to said rear side of said trailer such that said first side panel is removably retained on said trailer;

a second set of clamps, each of said second set of clamps selectively fastening said lip corresponding to said second side panel to said rear side of said trailer such that said second side panel is removably retained on said trailer; and a chimney being removably coupled to said awning, said chimney being configured to be fluidly coupled to a stove being positioned within said trailer thereby facilitating said chimney to direct combustion gases outwardly from said trailer, said chimney comprising:

a first pipe being removably insertable into said first end of said sleeve such that said first pipe extends upwardly from said top panel, and a second pipe being removably insertable into said second end of said sleeve such that said second pipe is in fluid communication with said first pipe, said second pipe being configured to be fluidly coupled to an exhaust of the stove thereby facilitating the combustion gases to be exhausted through said first pipe.

* * * * *